United States Patent
Shimoda et al.

(10) Patent No.: US 7,857,935 B2
(45) Date of Patent: Dec. 28, 2010

(54) PROCESS FOR PRODUCING MEMBRANE-ELECTRODE ASSEMBLY FOR POLYMER ELECTROLYTE FUEL CELLS

(75) Inventors: Hiroshi Shimoda, Tokyo (JP); Hirokazu Wakabayashi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/184,743

(22) Filed: Aug. 1, 2008

(65) Prior Publication Data

US 2009/0032179 A1 Feb. 5, 2009

Related U.S. Application Data

(60) Provisional application No. 60/957,336, filed on Aug. 22, 2007.

(30) Foreign Application Priority Data

Aug. 3, 2007 (JP) ............... 2007-202934

(51) Int. Cl.
*B29C 65/00* (2006.01)
*B32B 33/00* (2006.01)
(52) U.S. Cl. .................. 156/247; 156/90; 156/152; 156/182; 156/278
(58) Field of Classification Search .......... 156/247; 502/101
See application file for complete search history.

(56) References Cited

U.S. PATENT DOCUMENTS 5,186,877 A 2/1993 Watanabe
5,409,785 A * 4/1995 Nakano et al. ............... 429/33
7,091,149 B2 * 8/2006 Iwasaki et al. ............ 502/101
2002/0144394 A1 10/2002 Uchida et al.
2007/0015041 A1 * 1/2007 Kawai et al. ............... 429/42

FOREIGN PATENT DOCUMENTS

JP 4-162365 6/1992
WO WO 02/05371 A1 1/2002

\* cited by examiner

*Primary Examiner*—Philip C Tucker
*Assistant Examiner*—Alex Efta
(74) *Attorney, Agent, or Firm*—Oblon, Spivak, McClelland, Maier & Neustadt, L.L.P.

(57) ABSTRACT

To provide a process for producing a membrane-electrode assembly for polymer electrolyte fuel cells, which has a high output voltage in a wide range of current densities and is excellent in durability against a humidity change.

With respect to the process for producing a membrane-electrode assembly 10 comprising a first electrode 20 comprising a catalyst layer 12 and a gas diffusion layer 14, a second electrode 30 comprising a catalyst layer 12 and a gas diffusion layer 14 and the polymer electrolyte membrane 40 disposed between the catalyst layers 12 of the respective electrodes, the catalyst layer 12 is formed in such a manner that after forming a coating solution layer by applying a coating solution containing an electrode catalyst and an ion exchange resin on a substrate film, the gas diffusion layer 14 is put on the coating solution layer, and then, the coating solution layer is dried in such a state.

20 Claims, 3 Drawing Sheets

PROCESS FOR PRODUCING MEMBRANE-ELECTRODE ASSEMBLY FOR POLYMER ELECTROLYTE FUEL CELLS

BACKGROUND OF THE INVENTION

1. Field of the Invention

The present invention relates to a process for producing a membrane-electrode assembly for polymer electrolyte fuel cells.

2. Discussion of Background

A polymer electrolyte fuel cell is constituted by a plurality of membrane-electrode assemblies stacked one on another via an electrically conductive separator having gas channels formed therein, wherein each membrane-electrode assembly comprises a polymer electrolyte membrane and electrodes (a cathode (an air electrode) and an anode (a fuel electrode)) provided on both sides of the polymer electrolyte membrane. Each electrode is constituted by a catalyst layer being in contact with the polymer electrolyte membrane and a porous gas diffusion layer disposed on the exterior side of the catalyst layer. The gas diffusion layer performs a function to diffuse air or a fuel in the electrode and a function to discharge water formed in the electrode.

The following processes are known as processes for producing membrane-electrode assemblies.

(1) A process wherein on a gas diffusion layer, a coating solution containing an electrode catalyst and an ion exchange resin is applied to form a catalyst layer thereby to obtain an electrode, and two such electrodes are subjected to hot pressing for bonding in such a state that a polymer electrolyte membrane is sandwiched between the two electrodes (Patent Document 1).

(2) A process wherein on a substrate film, a coating solution containing an electrode catalyst and an ion exchange resin is applied, followed by drying to form a first catalyst layer; on the first catalyst layer, a coating solution containing an ion exchange resin is applied, followed by drying to form a polymer electrolyte membrane; on the polymer electrolyte membrane, a coating solution containing an electrode catalyst and an ion exchange resin is applied, followed by drying to form a second catalyst layer; from a laminate comprising the first catalyst layer, the polymer electrolyte membrane and the second catalyst layer, the substrate film is peeled off; and the laminate and two gas diffusion layers are subjected to hot pressing for bonding in such a state that the laminate is sandwiched between the two gas diffusion layers (Patent Document 2).

However, in the case of the process (1), the catalyst layer is formed by applying the coating solution having an electrode catalyst and an ion exchange resin dispersed in a solvent directly on the gas diffusion layer, whereby part of the ion exchange resin or the catalyst layer is likely to penetrate into the gas diffusion layer to clog part of voids in the gas diffusion layer. Especially, the ion exchange resin tends to penetrate into the inside of gas diffusion layer with the solvent from the catalyst layer. As a result, the gas diffusion properties of the gas diffusion layers tend to deteriorate, and there will be a problem such that in a high current density region, the output voltage of the polymer electrolyte fuel cell tends to be inadequate.

Further, with respect the electrode obtained by the process (1), a little ion exchange resin is present in the catalyst layer, whereby during hot pressing, bonding between the catalyst layer and the polymer electrolyte membrane is not sufficiently carried out. As a result, the following problems are caused:

(i) the resistance of the interface between the catalyst layer and the polymer electrolyte membrane increases (ii) the polymer electrolyte membrane tends to undergo swelling by humidification and shrinking by drying, whereby when humidification and drying are repeatedly carried out, the interface between the catalyst layer and the polymer electrolyte membrane tends to be easily peeled off, namely, the durability against a humidity change tends to decrease.

In the case of the process (2), the polymer electrolyte membrane is formed by applying the coating solution directly on the first catalyst layer, whereby part of the ion exchange resin is likely to penetrate into the first catalyst layer to clog many voids in the first catalyst layer. As a result, the gas diffusion properties of the first catalyst layer tend to deteriorate, and there will be a problem such that in a high current density region, the output voltage of the polymer electrolyte fuel cell tends to be inadequate.

Patent Document 1: JP-A-04-162365
Patent Document 2: WO02/005371

SUMMARY OF THE INVENTION

The present invention provides a process capable of producing a membrane-electrode assembly for polymer electrolyte fuel cells, having an excellent durability against a humidity change, whereby a high output voltage can be obtained within a wide range of current densities.

The process for producing a membrane-electrode assembly for polymer electrolyte fuel cells of the present invention is a process for producing a membrane-electrode assembly for polymer electrolyte fuel cells, which comprises a first electrode comprising a catalyst layer and a gas diffusion layer, a second electrode comprising a catalyst layer and a gas diffusion layer, and a polymer electrolyte membrane disposed between the catalyst layer of the first electrode and the catalyst layer of the second electrode, said process comprising the following steps (a) to (c) and (g):

(a) a step of applying a coating solution containing an electrode catalyst and an ion exchange resin on a substrate film to form a coating solution layer, (b) a step of putting a gas diffusion layer on the coating solution layer formed in the step (a), followed by drying the coating solution layer to form a catalyst layer, (c) a step of removing the substrate film from the catalyst layer formed in the step (b) to obtain the first electrode, and (g) a step of heat-bonding the first electrode, the second electrode and the polymer electrolyte membrane, to have the catalyst layer and the polymer electrolyte membrane contacted to each other.

The process for producing a membrane-electrode assembly for polymer electrolyte fuel cells of the present invention preferably further contains the following steps (d) to (f):

(d) a step of applying a coating solution containing an electrode catalyst and an ion exchange resin on a substrate film to form a coating solution layer, (e) a step of putting a gas diffusion layer on the coating solution layer formed in the step (d), followed by drying the coating solution layer to form a catalyst layer, and (f) a step of removing the substrate film from the catalyst layer formed in the step (e) to obtain the second electrode.

The process for producing a membrane-electrode assembly for polymer electrolyte fuel cells of the present invention is a process for producing a membrane-electrode assembly for polymer electrolyte fuel cells, which comprises a first electrode comprising a release layer, a catalyst layer and a gas diffusion layer in this order, a second electrode comprising a catalyst layer and a gas diffusion layer, and a polymer electrolyte membrane disposed between the release layer of the first electrode and the catalyst layer of the second electrode, the process comprising the following steps (a'), (b), (c) and (g):

(a') a step of applying a coating solution containing an electrode catalyst and an ion exchange resin on a release layer formed on the surface of a substrate film, to form a coating solution layer, (b) a step of putting a gas diffusion layer on the coating solution layer formed in the step (a'), followed by drying the coating solution layer to form a catalyst layer, (c) a step of removing the substrate film from the release layer after the step (b), to obtain the first electrode, and (g) a step of heat-bonding the first electrode, the second electrode and the polymer electrolyte membrane, to have the release layer of the first electrode and the polymer electrolyte membrane contacted to each other and to have the catalyst layer of the second electrode and the polymer electrolyte membrane contacted to each other.

The process for producing a membrane-electrode assembly for polymer electrolyte fuel cells of the present invention is a process for producing a membrane-electrode assembly for polymer electrolyte fuel cells, which comprises a first electrode comprising a release layer, a catalyst layer and a gas diffusion layer in this order, a second electrode comprising a release layer, a catalyst layer and a gas diffusion layer in this order, and a polymer electrolyte membrane disposed between the release layer of the first electrode and the release layer of the second electrode, the process comprising the following steps (a'), (b), (c), (d'), (e), (f) and (g):

(a') a step of applying a coating solution containing an electrode catalyst and an ion exchange resin on a release layer formed on the surface of a substrate film, to form a coating solution layer, (b) a step of putting a gas diffusion layer on the coating solution layer formed in the step (a'), followed by drying the coating solution layer to form a catalyst layer, (c) a step of removing the substrate film from the release layer after the step (b), to obtain the first electrode, (d') a step of applying a coating solution containing an electrode catalyst and an ion exchange resin on a release layer formed on the surface of a substrate film, to form a coating solution layer, (e) a step of putting a gas diffusion layer on the coating solution layer formed in the step (d'), followed by drying the coating solution layer to form a catalyst layer, (f) a step of removing the substrate film from the release layer after the step (e), to obtain the second electrode, and (g) a step of heat-bonding the first electrode, the second electrode and the polymer electrolyte membrane, to have each release layer and the polymer electrolyte membrane contacted to each other.

The release layer is one to make it easy for the substrate to be peeled off from the catalyst layer formed on the release layer without breaking the catalyst layer, and as the material for the release layer, a material having a high release property such as a silicone type resin, a fluorine type resin or a surfactant may be used. However, in order to bond the release layer with the polymer electrolyte membrane in the subsequent step, the release layer preferably contains an ion exchange resin, particularly preferably contains a fluorine type ion exchange resin as the main component. When the ion exchange resin is not contained as the main component, the thickness of the release layer is preferably as thin as possible. It is preferably at most 0.3 µm. When the ion exchange resin is contained as the main component, the thickness of the release layer is preferably from 0.1 to 5 µm.

The electrode catalyst preferably contains a noble metal, and the amount of the noble metal per unit area of the catalyst layer is from 0.01 to 0.5 mg/cm$^2$.

MEANINGS OF REFERENCE SYMBOLS

Figure 1:
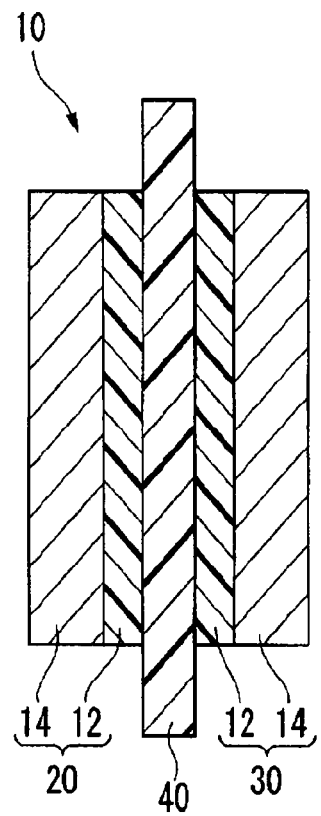
FIG. 1 is a cross sectional view showing an embodiment of the membrane-electrode assembly for polymer electrolyte fuel cells.

10: Membrane-electrode assembly
12: Catalyst layer
14: Gas diffusion layer
16: Coating solution layer
18: Release layer
20: First electrode
22: First electrode
30: Second electrode
32: Second electrode
40: Polymer electrolyte membrane
50: Substrate film
60: Membrane-electrode assembly
70: Membrane-electrode assembly

DETAILED DESCRIPTION OF THE PREFERRED EMBODIMENTS

By the process for producing a membrane-electrode assembly for polymer electrolyte fuel cells of the present invention, it is possible to produce a membrane-electrode assembly for polymer electrolyte fuel cells, having an excellent durability against a humidity change, whereby a high output voltage can be obtained within a wide range of current densities.

In this specification, a compound represented by the formula (2) will be referred to as the compound (2). Compounds represented by other formulae will be likewise referred to.

First Embodiment

FIG. 1 is a schematic cross sectional view showing an embodiment of the membrane-electrode assembly for polymer electrolyte fuel cells (hereinafter referred to as a membrane-electrode assembly). The membrane-electrode assembly 10 comprises a first electrode 20 having a catalyst layer 12 and a gas diffusion layer 14, a second electrode 30 having a catalyst layer 12 and a second diffusion layer 14, and a polymer electrolyte membrane 40 disposed between the first electrode 20 and the second electrode 30 in such a state that it is in contact with each catalyst layer 12.

The first electrode 20 may be an anode or a cathode. With respect to the second electrode 30, when the first electrode 20 is an anode, it is a cathode, and when the first electrode 20 is a cathode, it is an anode.

Catalyst Layers

The catalyst layer 12 contains an electrode catalyst and an ion exchange resin.

The electrode catalyst preferably contains a noble metal. As the noble metal, platinum or a platinum alloy is preferred.

As the electrode catalyst, a catalyst having platinum or a platinum alloy supported on a carbon support, is preferred.

As the carbon support, activated carbon or carbon black may, for example, be mentioned.

The specific surface area of the carbon support is preferably at least 200 m²/g. The specific surface area of the carbon support is measured by adsorption of nitrogen to the carbon surface by means of a BET specific surface area measuring device.

The platinum alloy is preferably an alloy of platinum with at least one metal selected from the group consisting of platinum group metals other than platinum (ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum with a metal to be alloyed with platinum.

As a platinum alloy for an anode, an alloy containing platinum and ruthenium is preferred, since the activity of the electrode catalyst will thereby be stabilized even when a gas containing carbon monoxide is supplied to the anode.

The amount of platinum or a platinum alloy to be supported is preferably from 10 to 80 mass % of the electrode catalyst (100 mass %).

The ion exchange capacity of the ion exchange resin is preferably from 0.5 to 2.5 meq/g dry resin, particularly preferably from 1.0 to 2.0 meq/g dry resin from the viewpoint of the electric conductivity and gas permeability.

As the ion exchange resin, a fluorinated ion exchange resin or a non-fluorinated ion exchange resin may, for example, be mentioned, and from the viewpoint of the durability, a fluorinated ion exchange resin is preferred.

The fluorinated ion exchange resin having ionic groups is preferably a perfluorocarbon polymer having sulfonic acid groups (which may contain etheric oxygen atoms), particularly preferably a copolymer (hereinafter referred to as a copolymer H) comprising units based on tetrafluoroethylene (hereinafter referred to as TFE) and repeating units having a sulfonic acid group. As the repeating units having a sulfonic acid group, repeating units represented by the following formula (1) are preferred.

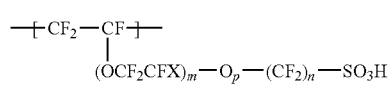

(1)

wherein X is a fluorine atom or a trifluoromethyl group, m is an integer of from 0 to 3, n is an integer of from 1 to 12, and p is 0 or 1.

The copolymer H can be obtained in such a manner that a mixture of TFE and a monomer having a —SO₂F group is polymerized to obtain a precursor polymer F, and then a —SO₂F group in the precursor polymer F is converted into a sulfonic acid group. The conversion of a —SO₂F group to a sulfonic acid group is carried out by hydrolysis or treatment for conversion to an acid form.

A compound (2) is preferred as the monomer having a —SO₂F group.

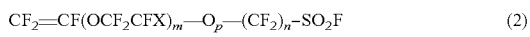

(2)

In the formula (2), X is a fluorine atom or a trifluoromethyl group, m is an integer of from 0 to 3, and n is an integer of from 1 to 12.

As the compound (2), compounds (2-1) to (2-3) are preferred.

(2-1)

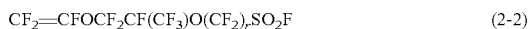

(2-2)

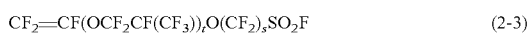

(2-3)

In the above formulae, each of q, r and s is an integer of from 1 to 8, and t is an integer of from 1 to 3.

The non-fluorinated ion exchange resin may, for example, be a sulfonated polyarylene, a sulfonated polybenzoxazole, a sulfonated polybenzothiazole, a sulfonated polybenzoimidazole, a sulfonated polysulfone, a sulfonated polyether sulfone, a sulfonated polyether ether sulfone, a sulfonated polyphenylene sulfone, a sulfonated polyphenylene oxide, a sulfonated polyphenylene sulfoxide, a sulfonated polyphenylene sulfide, a sulfonated polyphenylene sulfide sulfone, a sulfonated polyether ketone, a sulfonated polyether ether ketone, a sulfonated polyether ketone ketone or a sulfonated polyimide.

From the viewpoint of the electric conductivity and water repellency of the electrode, the mass ratio (F/C) of the ion exchange resin (F) to the carbon (C) in the electrode catalyst is preferably from 0.2 to 2.5, more preferably from 0.7 to 2.0. When F/C is at least 0.2, the catalyst layer 12 is hardly breakable. When F/C is at most 2.5, the catalyst layer 12 does not have a dense structure, whereby the gas diffusion property will be good.

The catalyst layer 12 may be a monolayer or a multi-layer. When it is a multi-layer, it is preferred to gradually increase F/C of each layer as it gets close to the polymer electrolyte membrane 40.

The amount of the noble metal per unit area of the catalyst layer 12 is preferably from 0.01 to 0.5 mg/cm², more preferably from 0.05 to 0.4 mg/cm², particularly preferably from 0.1 to 0.3 mg/cm². When the amount of the noble metal is at least 0.01 mg/cm², the amount of the coating solution to be applied on the substrate film is not too small, and the coating solution layer will be stable. When the amount of the noble metal is at most 0.5 mg/cm², the amount of the coating solution to be applied on the substrate film is not too large, penetration of the coating solution into the gas diffusion layer 14 is suppressed, and the catalyst layer 12 is hardly breakable. When the amount of the noble metal is from 0.05 to 0.4 mg/cm², the amount of the coating solution is proper, whereby it is possible to form the catalyst layer 12 having a uniform thickness. When the amount of the noble metal is from 0.1 to 0.3 mg/cm², it is possible to sufficiently suppress penetration of the coating solution into the gas diffusion layer and breaking of the catalyst layer 12.

The thickness of the catalyst layer is preferably at most 20 μm, more preferably from 1 to 15 μm from the viewpoint of making the gas diffusion property of the catalyst layer 12 good and improving the characteristic of the power generation of the polymer electrolyte fuel cell. Further, the thickness of the catalyst layer 12 is preferably uniform. If the thickness of the catalyst layer is made thin, the amount of the electrode catalyst per unit area decreases, and the activity of the reaction of the electrode may be low. However, in such a case, a supported catalyst having platinum or a platinum alloy supported in a high supported ratio may be used as an electrode catalyst, whereby it will be possible to maintain the reaction activity of the electrode to be high without deficiency in the amount of the electrode catalyst.

Gas Diffusion Layers

The gas diffusion layer 14 has a gas-diffusing substrate.

The gas-diffusing substrate is a porous substrate having electric conductivity. The gas-diffusing substrate may, for example, be carbon cloth, carbon paper or carbon felt.

The gas-diffusing substrate is preferably treated for water repellency by using e.g. polytetrafluoroethylene (hereinafter referred to as PTFE); or a mixture of PTFE with carbon black. By having treatment for water repellency, clogging of pores of the gas-diffusing substrate by water, etc. formed on the catalyst layer 12 on a cathode side, is suppressed, whereby deterioration of the gas diffusion property is suppressed. Further, by using carbon black during the treatment for water repellency, the electric conductivity of the membrane electrode assembly 10 will be good.

The thickness of the gas diffusion layer 14 is preferably from 100 to 400 μm, more preferably from 140 to 350 μm.

Electrolyte Membrane

The electrolyte membrane 40 is made of an ion exchange resin membrane.

The ion exchange resin for the membrane may be the same as the ion exchange resin for the catalyst layer 12, and it is preferably the same ion exchange resin for the catalyst layer 12.

The polymer electrolyte membrane 40 preferably contains an inhibitor to suppress formation of a peroxide. In a case where a polymer electrolyte fuel cell is operated for a long time, by the formation of a peroxide, the polymer electrolyte membrane 40 will deteriorate, and the output voltage of the polymer electrolyte fuel cell will decrease. The inhibitor is preferably incorporated in the coating solution for an electrolyte membrane, which will be described later.

The thickness of the electrolyte membrane is preferably at most 50 μm, more preferably from 3 to 40 μm, particularly preferably from 5 to 30 μm. When the thickness of the polymer electrolyte membrane 40 is at most 50 μm, the polymer electrolyte membrane 40 is rarely brought to a dried state, whereby deterioration of the characteristic of the power generation of the polymer electrolyte fuel cell can be suppressed. When the thickness of the polymer electrolyte membrane 40 is at least 3 μm, short circuiting can be avoided.

As the method for producing a polymer electrolyte membrane 40, when the ion exchange resin is a copolymer H, the following methods (x) and (y) may be mentioned, and from the viewpoint of consistency of the thickness and productivity, the method (y) is preferred.

(x) A method of forming the precursor polymer F into a membrane and then converting a —$SO_2F$ group to a sulfonic acid group.

(y) A method of forming the copolymer H into a membrane.

Method (x):

As the method of forming the precursor polymer F into a membrane, e.g. extrusion molding, press molding, or stretch molding may be mentioned.

The conversion of a —$SO_2F$ group to a sulfonic acid group may be carried out by hydrolysis or treatment for conversion to an acid-form.

Method (y):

As the method of forming the copolymer H into a membrane, a method of applying a coating solution for the electrolyte membrane containing the copolymer H on the substrate film and drying it (cast method), may be mentioned.

The coating solution for the electrolyte membrane is a dispersion having the copolymer H dispersed in a dispersion medium including an alcohol and water.

The drying temperature is preferably from 70 to 170° C.

The polymer electrolyte membrane 40 is subjected to heat treatment (anneal treatment) after drying or at the same time as drying.

The temperature for the heat treatment is preferably from 100 to 250° C., more preferably from 130 to 220° C., particularly preferably from a temperature higher than the glass transition temperature (Tg) of the copolymer H to (Tg+100)° C.

The heat treatment time is preferably from 5 minutes to 3 hours, more preferably from 10 minutes to 1 hour. When the heat treatment time is at least 5 minutes, the strength of the polymer electrolyte membrane 40 will be sufficient. When the heat treatment time is at most 3 hours, the productivity will be good.

Process for Producing Membrane-Electrode Assembly

As the process for producing a membrane-electrode assembly 10, the following process (I) or (II) may be mentioned.

Process (I)

Figure 2:
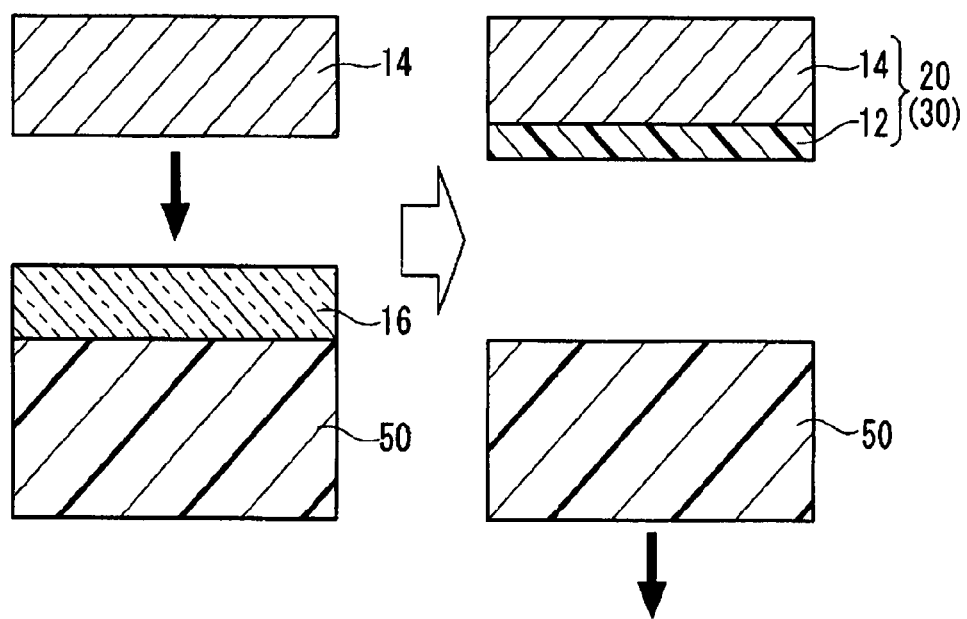
FIG. 2 is a cross sectional view showing one step in the process for producing a membrane-electrode assembly for polymer electrolyte fuel cells of the present invention.

The process (I) is a process comprising the following steps (a) to (g):

(a) a step of applying a coating solution containing an electrode catalyst and an ion exchange resin on a substrate film 50 to form a coating solution layer 16, as shown in FIG. 2, (b) a step of putting a gas diffusion layer 14 on the coating solution layer 16 formed in the step (a), followed by drying the coating solution layer 16 to form a catalyst layer 12, as shown in FIG. 2, (c) a step of removing the substrate film 50 from the catalyst layer 12 formed in the step (b) to obtain a first electrode 20, as shown in FIG. 2, (d) a step of applying a coating solution containing an electrode catalyst and an ion exchange resin on a substrate film 50 to form a coating solution layer 16, as shown in FIG. 2, (e) a step of putting a gas diffusion layer 14 on the coating solution layer 16 formed in the step (d), followed by drying the coating solution layer 16 to form a catalyst layer 12, as shown in FIG. 2, (f) a step of removing the substrate film 50 from the catalyst layer 12 formed in the step (e) to obtain a second electrode 30, as shown in FIG. 2, and (g) a step of heat-bonding the first electrode 20 obtained in the step (c), the second electrode 30 obtained in the step (f) and a polymer electrolyte membrane 40 to have each catalyst layer 12 and the polymer electrolyte membrane 40 contacted to each other.

Step (a):

As the substrate film 50, a resin film may be mentioned. As a material for the resin film, the following resins may be mentioned, and from the viewpoint of heat resistance, chemical stability and release property, a fluorinated resin is preferred.

Non-fluorinated resin: polyethylene terephthalate, polyethylene, polypropylene, polyimide, etc.

Fluorinated resin: PTFE, an ethylene/TFE copolymer (hereinafter referred to as ETFE), an ethylene/hexafluoropropylene copolymer, a TFE/perfluoro(alkyl vinyl ether) copolymer, polyvinylidene fluoride, etc.

A coating solution for the catalyst layer is prepared by dispersing an electrode catalyst in a solvent, and dissolving or dispersing an ion exchange resin in the solvent.

When the ion exchange resin is a fluorinated ion exchange resin, an alcohol or a fluorinated solvent is preferred as the solvent.

The alcohol may, for example, be ethanol, n-propanol, isopropanol, n-butanol, isobutanol or tert-butanol. In order to increase the solubility of the ion exchange resin, it is possible to use a solvent mixture of the alcohol and water.

As the fluorinated solvent, the followings are mentioned.

Hydrofluorocarbon: 2H-perfluoropropane, 1H,4H-perfluorobutane, 2H,3H-perfluoropentane, 3H,4H-perfluoro(2-methylpentane), 2H,5H-perfluorohexane, 3H-perfluoro(2-methylpentane), etc.

Fluorocarbon: perfluoro(1,2-dimethyl cyclorobutane), perfluorooctane, perfluoroheptane, perfluorohexane, etc.

Hydrochlorofluorocarbon: 1,1-dichloro-1-fluoroethane, 1,1,1-trifluoro-2,2-dichloroethane, 3,3-dichloro-1,1,1,2,2-pentafluoropropane, 1,3-dichloro-1,1,2,2,3-pentafluoropropane, etc.

Fluoroether: 1H,4H,4H-perfluoro(3-oxapentane), 3-methoxy-1,1,1,2,3,3-hexafluoropropane, etc.

Fluorinated alcohol: 2,2,2-trifluoroethanol, 2,2,3,3,3-pentafluoro-1-propanol, 1,1,1,3,3,3-hexafluoro-2-propanol, etc.

When the ion exchange resin is a non-fluorinated ion exchange resin, the solvent may, for example, be N,N-dimethyl formamide, dimethyl sulfoxide, dimethyl acetamide, N-methylpyrolidone, methylene chloride, chloroform, carbon tetrachloride, 1,1,1-trichloroethane, 1,1,2-trichloroethane, trichloroethylene or tetrachloroethylene.

The solid concentration of the coating solution for the catalyst layer is preferably from 5 to 25 mass %, more preferably from 8 to 15 mass %. In a case where the solid concentration of the coating solution for the catalyst layer is at least 5 mass %, there will be little penetration of the coating solution for the catalyst layer into the gas diffusion layer 14 when the gas diffusion layer 14 is put on the coating solution layer 16. When the solid concentration of the coating solution for the catalyst layer is at most 25 mass %, it will be possible to form the catalyst layer 12 having a uniform thickness. When the solid concentration of the coating solution for the catalyst layer is from 8 to 15 mass %, the stability of the coating solution for the catalyst layer will improve.

The viscosity of the coating solution for the catalyst layer is preferably from 200 to 8,000 mPa·s, more preferably from 1,000 to 4,000 mPa·s, when the shear velocity is 1 (1/S). When the viscosity of the coating solution for the catalyst layer is at least 200 mPa·s, there will be little penetration of the coating solution for the catalyst layer into the gas diffusion layer 14. When the viscosity of the coating solution for the catalyst layer is at most 8,000 mPa·s, it will be possible to form the catalyst layer 12 having a uniform thickness. When the viscosity of the coating solution for the catalyst layer is from 1,000 to 4,000 mPa·s, the stability of the coating solution for the catalyst layer will improve.

F/C in the coating solution for the catalyst layer is preferably from 0.2 to 2.5, more preferably from 0.7 to 2.0. When F/C is at least 0.2, the catalyst layer 12 will rarely be breakable. When F/C is at most 2.5, the catalyst layer 12 will not have a dense structure and the gas diffusion property will be good. When F/C is from 0.7 to 2.0, the catalyst layer 12 will more rarely be breakable and the gas diffusion property will be better.

The coating solution layer 16 may be a monolayer or a multi-layer. When it is a multi-layer, several coating solutions for the catalyst layer corresponding to the number of layers are prepared and applied simultaneously or sequentially. When it is a multi-layer, it is preferred to gradually increase F/C of each layer as it gets close to the polymer electrolyte membrane 40.

The coating method may be a batch type coating method or a continuous type coating method.

The batch type coating method may, for example, be a bar coater method, a spin coater method or a screen printing method.

The continuous type coating method may, for example, be a post measuring method or a pre-measuring method. The post measuring method is a method wherein an excess coating solution for the catalyst layer is applied, and the coating solution for the catalyst layer is subsequently removed to obtain a prescribed thickness. The pre-measuring method is a method wherein the coating solution is applied in an amount required to obtain a prescribed thickness.

The post measuring method may, for example, be an air doctor coater method, a blade coater method, a rod coater method, a knife coater method, a squeeze coater method, an impregnation coater method or a comma coater method.

The pre-measuring method may, for example, be a die coater method, a reverse roll coater method, a transfer roll coater method, a gravure coater method, a kiss roll coater method, a cast coater method, a spray coater method, a curtain coater method, a calender coater method or an extrusion coater method.

The application method is preferably a screen printing method or a die coater method from such a viewpoint that the coating solution layer 16 having a uniform thickness can be formed, and a die coater method is more preferred from the viewpoint of the production efficiency.

Step (b):

As the gas diffusion layer 14, it is possible to use the above gas-diffusing substrate as it is. As the case requires, the gas-diffusing substrate may be treated for water repellency.

The coating solution layer 16 is formed by the application of the coating solution for the catalyst layer, and it is a coating wherein all or part of the solvent contained in the coating solution for the catalyst layer remains. The remaining solvent in the coating solution layer 16 is preferably at least 20 mass % based on the solvent (100 mass %) contained in the coating solution for the catalyst layer.

The gas diffusion layer 14 may be put on the coating solution layer 16 immediately after applying the coating solution for the catalyst layer on the substrate film 50, or after letting part of the solvent contained in the coating solution layer 16 evaporate. Usually, water or an alcohol is used as a solvent, whereby it is preferred to put the gas diffusion layer 14 on the coating solution layer 16 within 5 minutes from the application of the coating solution for the catalyst layer on the substrate film 50.

Part of the solvent contained in the coating solution layer 16 may be evaporated at room temperature or evaporated by heating. When part of the solvent contained in the coating solution layer 16 is evaporated before the gas diffusion layer 14 is put on the coating solution layer 16, the heating temperature is preferably at most 100° C.

When the coating solution layer 16 is dried after the gas diffusion layer 14 is put on the coating solution layer 16, the drying temperature is preferably from 50 to 150° C. When the drying temperature is at least 50° C., drying will not take time, and the ion exchange resin for the catalyst layer 12 will be sufficiently heat-treated and will be thereby stabilized. When the drying temperature is at most 150° C., the catalyst layer 12 will not easily deteriorate and will not be burned.

When drying of the coating solution layer 16 is continuously carried out in a drying furnace, the drying temperature is preferably raised gradually. It is more preferred to adjust the temperature at the inlet of the drying furnace to be from 50 to 80° C., and at the outlet of the drying furnace to be from 120 to 150° C., from such a viewpoint that the drying time will be short, the ion exchange resin for the catalyst layer 12 will be sufficiently heat-treated and will have a stable structure, and the characteristic of the power generation of the polymer electrolyte fuel cell will be good.

The drying time of the coating solution layer 16 after the gas diffusion layer 14 is put on the coating solution layer 16 is preferably from 3 to 30 minutes, more preferably from 5 to 15 minutes. When the drying time is at least 3 minutes, drying will be sufficiently carried out, and the solvent will hardly remain. When the drying time is at most 30 minutes, the productivity will improve, and if the drying temperature is higher than 130° C., the deterioration of the catalyst layer 12 will hardly proceed. When the drying time is from 5 to 15 minutes, the characteristic of the power generation of the polymer electrolyte fuel cell will sufficiently be developed.

Step (c):

The step (c) may be carried out immediately before the step (g), and the first electrode 20 attached to the substrate film 50 obtained in the step (b) may be stored in a state of being protected by the substrate film 50 until immediately before the step (g).

Steps (d) to (f):

The steps (d) to (f) may be carried out in the same manner as in the steps (a) to (c).

Step (g):

During heat-bonding, the first electrode 20, the second electrode 30 and the polymer electrolyte membrane 40 may be simultaneously heat-bonded, or either one of the first electrode 20 or the second electrode 30 may be heat-bonded with the polymer electrolyte membrane 40 first, followed by the heat-bonding of the other electrode with the polymer electrolyte membrane 40.

The bonding method may, for example, be a hot pressing method, hot roll pressing or supersonic fusion. From the viewpoint of the uniformity in the plane, the hot pressing method is preferred.

The pressing temperature (temperature of a press plate in a pressing machine) is preferably from 120 to 160° C., more preferably from 130 to 150° C. When the pressing temperature is at least 120° C., the bonding will sufficiently be carried out, and the increase of resistance by contacting failure will be suppressed. When the pressing temperature is at most 160° C., the catalyst layer 12 will hardly deteriorate, and the polymer electrolyte membrane 40 will hardly deform. When the pressing temperature is from 130 to 150° C., the characteristic of the power generation of the polymer electrolyte fuel cell and the durability will be good.

The pressing pressure is preferably from 0.5 to 5 MPa, more preferably from 1 to 4 MPa. When the pressing pressure is at least 0.5 MPa, the bonding will sufficiently be carried out, and the increase of resistance by contacting failure will be suppressed. When the pressing pressure is at most 5 MPa, the catalyst layer 12 will hardly deteriorate, and the polymer electrolyte membrane 40 will hardly deform. When the pressing pressure is from 1 to 4 MPa, the characteristic of the power generation of the polymer electrolyte fuel cell and the durability will be good.

The pressing time is preferably from 0.5 to 10 minutes, more preferably from 1 to 5 minutes. When the pressing time is at least 0.5 minute, the bonding will sufficiently be carried out, and the increase of resistance by contacting failure will be suppressed. When the pressing time is at most 10 minutes, the catalyst layer 12 will hardly deteriorate, and the polymer electrolyte membrane 40 will hardly deform. When the pressing time is from 1 to 5 minutes, the characteristic of the power generation of the polymer electrolyte fuel cell and the durability will be good.

Process (II)

The process (II) is a process comprising the following steps (a) to (c), (d"), (e") and (g).

Figure 3:
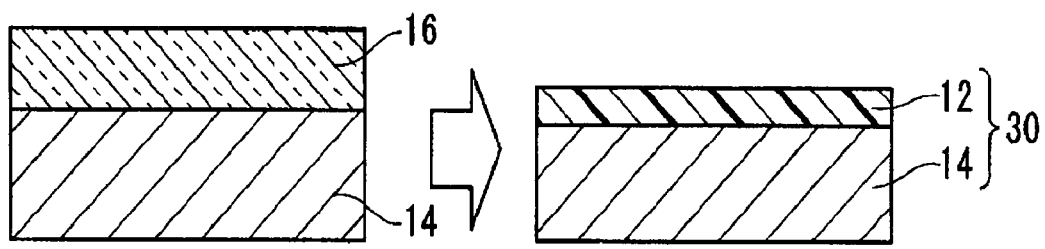
FIG. 3 is a cross sectional view showing one step in the process for producing a membrane-electrode assembly for polymer electrolyte fuel cells of the present invention.

(a) a step of applying a coating solution containing an electrode catalyst and an ion exchange resin on a substrate film 50 to form a coating solution layer 16, as shown in FIG. 2, (b) a step of putting a gas diffusion layer 14 on the coating solution layer 16 formed in the step (a), followed by drying the coating solution layer 16 to form a catalyst layer 12, as shown in FIG. 2, (c) a step of removing the substrate film 50 from the catalyst layer 12 formed in the step (b) to obtain a first electrode 20, as shown in FIG. 2, (d") a step of applying a coating solution containing an electrode catalyst and an ion exchange resin on a gas diffusion layer 14 to form a coating solution layer 16, as shown in FIG. 3, (e") a step of drying the coating solution layer 16 formed in the step (d") to form a catalyst layer 12, and thereby to obtain a second electrode 30, as shown in FIG. 3, and (g) a step of heat-bonding the first electrode 20 obtained in the step (c), the second electrode 30 obtained in the step (e") and a polymer electrolyte membrane 40 to have each catalyst layer 12 and the polymer electrolyte membrane 40 contacted to each other.

Steps (a) to (c):

The steps (a) to (c) may be carried out in the same manner as in the steps (a) to (c) in the process (I).

Step (d")

As the gas diffusion layer 14, it is possible to use the above gas-diffusing substrate as it is. As the case requires, the gas-diffusing substrate may be treated for water repellency.

The material, composition, preparation process, etc. of the coating solution for the catalyst layer are the same as in the step (a).

The application method, application conditions, etc. of the coating solution for the catalyst layer are the same as in the step (a).

Step (e")

The drying conditions for the coating solution layer 16 are the same as in the step (b).

Step (g):

The step (g) may be carried out in the same manner as in the step (g) in the process (I).

According to the above-described processes for producing the membrane-electrode assembly 10, at least one of the catalyst layers 12 is formed in such a manner that after forming the coating solution layer 16 by applying the coating solution for the catalyst layer on the substrate film 50, the gas diffusion layer is put on the coating solution layer 16, without drying the coating solution layer 16 completely, but in a state where the coating solution layer 16 still contains the solvent, and then, the coating solution layer 16 is dried in such a state. Therefore, part of the coating solution layer 16 penetrates into the gas diffusion layer 14, whereby the adhesion between the obtainable catalyst layer 12 and the gas diffusion layer 14 will improve, and also, a large amount of the ion exchange resin will be present on the surface of the catalyst layer 12. Consequently, the adhesion of the interface between the catalyst layer 12 and the polymer electrolyte membrane 40 by heat-bonding will be high, the resistance in the interface will be low, and the characteristic of the power generation of the polymer electrolyte fuel cell will be good. Further, even when the humidification degree changes, since the adhesion of the interface is high, peeling will not take place, and the output voltage of the polymer electrolyte fuel cell will not thereby decrease. Namely, the durability against a humidity change will be excellent.

Second Embodiment

Figure 4:
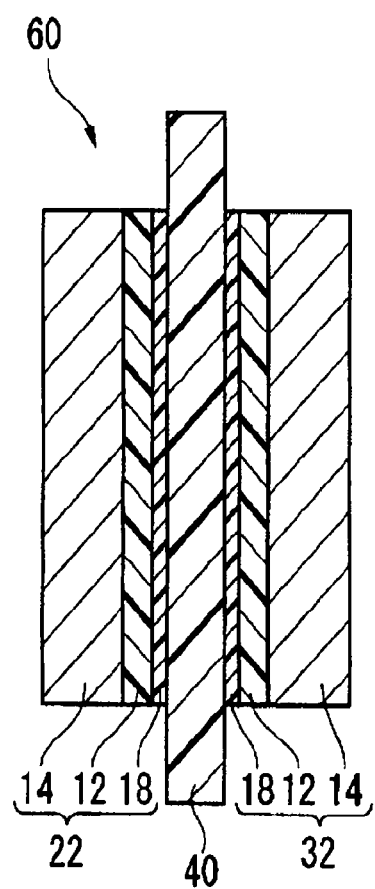
FIG. 4 is a cross sectional view showing another embodiment of the membrane-electrode assembly for polymer electrolyte fuel cells.

FIG. 4 is a cross sectional view showing another example of the membrane-electrode assembly. A membrane-electrode assembly 60 comprises a first electrode 22 comprising a release layer 18, a catalyst layer 12 and a gas diffusion layer 14 in this order, a second electrode 32 comprising a release layer 18, a catalyst layer 12 and a gas diffusion layer 14 in this order, and a polymer electrolyte membrane 40 disposed between the first electrode 22 and the second electrode 32 in the state of being in contact with each release layer 18.

The first electrode 22 may be an anode or a cathode. The second electrode 32 is a cathode when the first electrode 22 is an anode, and it is an anode when the first electrode is a cathode.

In this embodiment, with respect to the same structures as in the first embodiment, the same symbols as in FIG. 1 are used thereby to omit the description.

Release Layer

A release layer 18 is one to improve the release property of a substrate film from an electrode during the formation of the electrode.

As the material for the release layer 18, it is possible to use a material having a high release property such as a silicone resin, a fluorine resin or a surfactant. However, in order to bond it with a polymer electrolyte membrane in the subsequent step, the release layer 18 contains preferably an ion exchange resin, particularly preferably a fluorine type ion exchange resin as the main component. In a case where the ion exchange resin is contained as the main component, it is possible to improve the adhesion of the interface between is the electrode and a polymer electrolyte membrane 40 when the release layer 18 is bonded with the polymer electrolyte membrane.

As the ion exchange resin, the same ion exchange resin as for the catalyst layer 12 may be mentioned. It is particularly preferably the same ion exchange resin as the ion exchange resin for the catalyst layer 12 and the polymer electrolyte membrane 40.

Further, part of the release layer 18 may penetrate into pores of the catalyst layer 12.

The thickness of the release layer 18 is preferably as thin as possible, particularly preferably at most 0.3 µm when an ion exchange resin is not contained as the main component. When the ion exchange resin is contained as the main component, the thickness of the release layer 18 is preferably from 0.1 to 5 µm, particularly preferably from 0.5 to 3 µm. When the thickness of the release layer 18 is at least 0.1 µm, the catalyst layer 12 will rarely break, and the catalyst layer 12 will not remain on the substrate film. When the thickness of the release layer 18 is at most 5 µm, the increase of space between two catalyst layers 12 will be suppressed when the release layer 18 is bonded with the polymer electrolyte membrane 40, whereby it will be possible to suppress the increase of resistance. When the thickness of the release layer 18 is from 0.5 to 3 µm, the release property of the substrate film from the electrodes will be good, it will be possible to maintain the sufficient adhesion with the polymer electrolyte membrane 40, and there will be little increase of resistance.

The release layer 18 containing the ion exchange resin can be obtained by applying a coating solution for the release layer containing the ion exchange resin, on the substrate film, followed by drying.

The solid concentration of the coating solution for the release layer is preferably from 1 to 10 mass %, more preferably from 3 to 8 mass %.

The drying temperature is preferably from 70 to 170° C.

Process for Producing Membrane-Electrode Assembly

As the process for producing a membrane-electrode assembly 60, the following process (III) may be mentioned.

Process (III)

The process (III) is a process comprising the following steps (a'), (b), (c), (d'), and (e) to (g).

Figure 5:
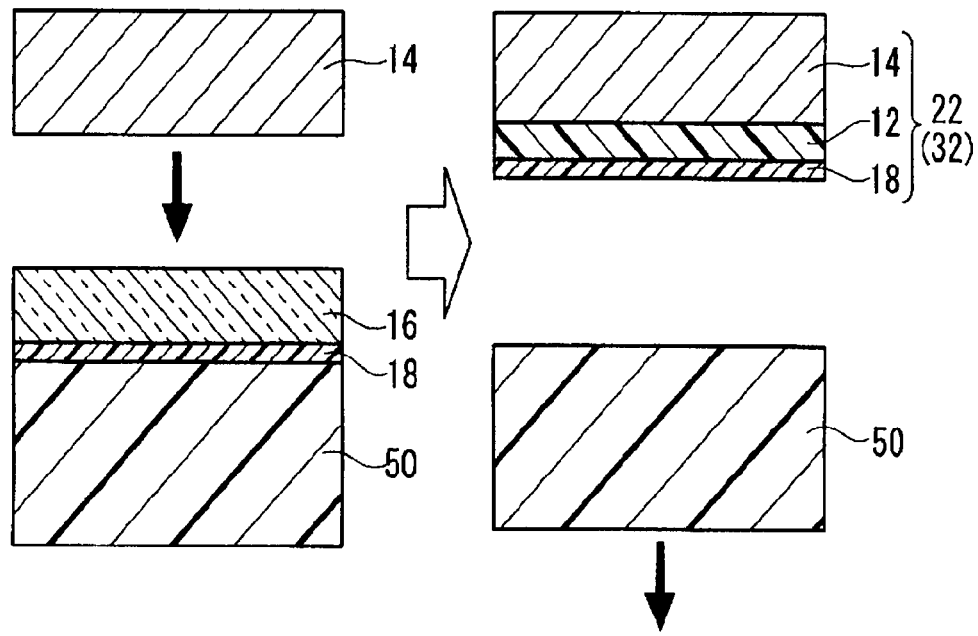
FIG. 5 is a cross sectional view showing one step in the process for producing a membrane-electrode assembly for polymer electrolyte fuel cells of the present invention.

(a') a step of applying a coating solution containing an electrode catalyst and an ion exchange resin on a release layer 18 formed on a substrate film 50 to form a coating solution layer 16, as shown in FIG. 5, (b) a step of putting a gas diffusion layer 14 on the coating solution layer 16 formed in the step (a'), followed by drying the coating solution layer 16 to form a catalyst layer 12, as shown in FIG. 5, (c) a step of removing the substrate film 50 from the release layer 18 after the step (b) to obtain a first electrode 22, as shown in FIG. 5, (d') a step of applying a coating solution containing an electrode catalyst and an ion exchange resin on a release layer formed on a substrate film 50 to form a coating solution layer 16, as shown in FIG. 5, (e) a step of putting a gas diffusion layer 14 on the coating solution layer 16 formed in the step (d'), followed by drying the coating solution layer 16 to form a catalyst layer 12, as shown in FIG. 5, (f) a step of removing the substrate film 50 from the release layer 18 after the step (e) to obtain a second electrode 32, as shown in FIG. 5, and (g) a step of heat-bonding the first electrode 22 obtained in the step (c), the second electrode 32 obtained in the step (f) and a polymer electrolyte membrane 40 to have each release layer 18 and the polymer electrolyte membrane 40 contacted to each other.

Step (a'):

The material, composition, preparation method, etc. of the coating solution for the catalyst layer are the same as in the step (a) in the process (I).

The application method, application conditions, etc. of the coating solution for the catalyst layer are the same as in the step (a) in the process (I).

Steps (b) and (c):

The steps (b) and (c) may be carried out in the same manner as in the steps (b) and (c) in the process (I).

Steps (d'), (e) and (f):

The steps (d'), (e) and (f) may be carried out in the same manner as in the steps (a'), (b) and (c).

Step (g):

The step (g) may be carried out in the same manner as in the step (g) in the process (I).

According to the above-described process for producing the membrane-electrode assembly 60, by the release layer 18, the catalyst layer 12 can be removed from the substrate film 50 without being broken. Especially, the release layer 18 containing an ion exchange resin, means that the release layer 18 containing the ion exchange resin in a larger amount than the catalyst layer 12 is provided on the surface of the catalyst layer 12 of each electrode, whereby the adhesion of the interface between the release layer 18 and the polymer electrolyte membrane 40 by heat-bonding will be high, the resistance in the interface will be low, and the characteristic of the power generation of the polymer electrolyte fuel cell will be good. Further, even when the humidification degree changes, since the adhesion of the interface is high, peeling will not take place, and the output voltage of the polymer electrolyte fuel cell will not thereby decrease. Namely, the durability against a humidity change will be excellent.

Further, the catalyst layer 12 is formed in such a manner that after forming the coating solution layer 16 by applying the coating solution for the catalyst layer on the release layer 18 formed on the surface of the substrate film 50, the gas diffusion layer 14 is put on the coating solution layer 16, without drying the coating solution layer 16 completely but in a state where the coating solution layer 16 still contains the solvent, and then, the coating solution layer 16 is dried in such a state, whereby a large amount of the ion exchange resin will be present on the surface of the catalyst layer 12. Therefore, the adhesion of the interface between the release layer 18 and the catalyst layer 12 will be high, the resistance in the interface will be low, and the characteristic of the power generation of the polymer electrolyte fuel cell will be good. Further, even when the humidification degree changes, since the adhesion of the interface is high, peeling will not take place, and the output voltage of the polymer electrolyte fuel cell will not thereby decrease. Namely, the durability against a humidity change will be excellent.

Third Embodiment

Figure 6:
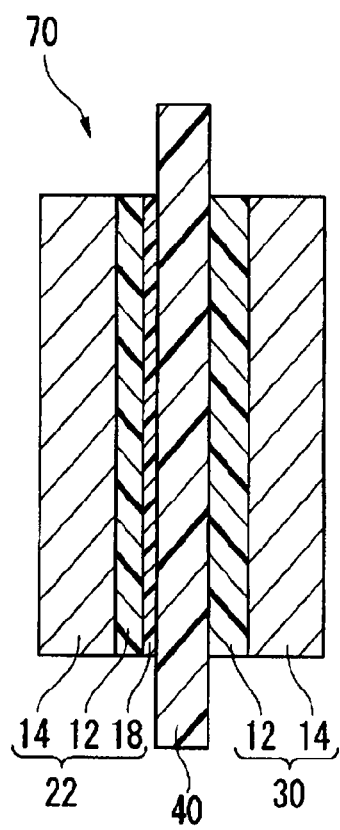
FIG. 6 is a cross sectional view showing another embodiment of the membrane-electrode assembly for polymer electrolyte fuel cells.

FIG. 6 is a cross sectional view showing another example of the membrane-electrode assembly. A membrane-electrode assembly 70 comprises a first electrode 22 comprising a release layer 18, a catalyst layer 12 and a gas diffusion layer 14 in this order, a second electrode 30 comprising a catalyst layer 12 and a gas diffusion layer 14 in this order, and a polymer electrolyte membrane 40 disposed between the first electrode 22 and the second electrode 30 in the state of being in contact with the release layer 18 of the first electrode 22 and the catalyst layer 12 of the second electrode 30.

The first electrode 22 may be an anode or a cathode. The second electrode 30 is a cathode when the first electrode 22 is an anode, and it is an anode when the first electrode 22 is a cathode.

In this embodiment, with respect to the same structures as in the first embodiment, the same symbols as in FIG. 1 are used thereby to omit the description. Further, with respect to the same structures as in the second embodiment, the same symbols as in FIG. 4 are used thereby to omit the description.

Process For Producing Membrane-Electrode Assembly

As the process for producing the membrane-electrode assembly 70, the following process (IV) or (V) may be mentioned.

Process (IV)

The process (IV) is a process comprising the following steps (a'), (b), (c), (d"), (e") and (g).

(a') a step of applying a coating solution containing an electrode catalyst and an ion exchange resin on a release layer 18 formed on a substrate film 50 to form a coating solution layer 16, as shown in FIG. 5, (b) a step of putting a gas diffusion layer 14 on the coating solution layer 16 formed in the step (a'), followed by drying the coating solution layer 16 to form a catalyst layer 12, as shown in FIG. 5, (c) a step of removing the substrate film 50 from the release layer 18 after the step (b) to obtain a first electrode 22, as shown in FIG. 5, (d") a step of applying a coating solution containing an electrode catalyst and an ion exchange resin on a gas diffusion layer 14 to form a coating solution layer 16, as shown in FIG. 3, (e") a step of drying the coating solution layer 16 formed in the step (d") to form a catalyst layer 12, and thereby to obtain a second electrode 30, as shown in FIG. 3, and (g) a step of heat-bonding the first electrode 22 obtained in the step (c), the second electrode 30 obtained in the step (e") and a polymer electrolyte membrane 40 to have the release layer 18 of the first electrode 22 and the polymer electrolyte membrane 40 contacted to each other and to have the catalyst layer 12 of the second electrode 30 and the polymer electrolyte membrane 40 contacted to each other.

Steps (a'), (b) and (c):

The steps (a'), (b) and (c) may be carried out in the same manner as in the steps (a'), (b) and (c) in the process (III).

Steps (d") and (e"):

The steps (d") and (e") may be carried out in the same manner as in the steps (d") and (e") in the process (II).

Step (g):

The step (g) may be carried out in the same manner as in the step (g) in the process (III).

Process (V)

The process (V) is a process comprising the following steps (a') and (b) to (g).

(a') a step of applying a coating solution containing an electrode catalyst and an ion exchange resin on a release layer 18 formed on a substrate film 50 to form a coating solution layer 16, as shown in FIG. 5, (b) a step of putting a gas diffusion layer 14 on the coating solution layer 16 formed in the step (a'), followed by drying the coating solution layer 16 to form a catalyst layer 12, as shown in FIG. 5, (c) a step of removing the substrate film 50 from the release layer 18 after the step (b) to obtain a first electrode 22, as shown in FIG. 5, (d) a step of applying a coating solution containing an electrode catalyst and an ion exchange resin on a substrate film 50 to form a coating solution layer 16, as shown in FIG. 2, (e) a step of putting a gas diffusion layer 14 on the coating solution layer 16 formed in the step (d), followed by drying the coating solution layer 16 to form a catalyst layer 12, as shown in FIG. 2, (f) a step of removing the substrate film 50 from the catalyst layer 12 formed in the step (e) to obtain a second electrode 30, as shown in FIG. 2, and (g) a step of heat-bonding the first electrode 22 obtained in the step (c), the second electrode 30 obtained in the step (f) and a polymer electrolyte membrane 40 to have the release layer 18 of the first electrode 22 and the polymer electrolyte membrane 40 contacted to each other and to have the catalyst layer 12 of the second electrode 30 and the polymer electrolyte membrane 40 contacted to each other.

Steps (a'), (b) and (c):

The steps (a'), (b) and (c) may be carried out in the same manner as in the steps (a'), (b) and (c) in the process (III).

Steps (d) to (f):

The steps (d) to (f) may be carried out in the same manner as in the steps (d) to (f) in the process (I).

Step (g):

The step (g) may be carried out in the same manner as in the step (g) in the process (III).

According to the above-described processes for producing the membrane-electrode assembly 70, by the release layer 18, the catalyst layer 12 can be removed from the substrate film 50 without being broken. Especially, the release layer 18 containing an ion exchange resin, means that the release layer 18 containing the ion exchange resin in a larger amount than the catalyst layer 12 is provided on the surface of the catalyst layer 12 of the first electrode 22, whereby the adhesion of the interface between the release layer 18 and the polymer electrolyte membrane 40 by heat-bonding will be high, the resistance in the interface will be low, and the characteristic of the power generation of the polymer electrolyte fuel cell will be good. Further, even when the humidification degree changes, since the adhesion of the interface is high, peeling will not take place, and the output voltage of the polymer electrolyte fuel cell will not thereby decrease. Namely, the durability against a humidity change will be excellent.

Further, the catalyst layer 12 is formed in such a manner that after forming the coating solution layer 16 by applying the coating solution for the catalyst layer on the release layer 18 formed on the surface of the substrate film 50, the gas diffusion layer 14 is put on the coating solution layer 16, without drying the coating solution layer 16 completely but in a state where the coating solution layer 16 still contains the solvent, and then, the coating solution layer 16 is dried in such a state, whereby a large amount of the ion exchange resin will be present on the surface of the catalyst layer 12. Therefore, the adhesion of the interface between the release layer 18 and the catalyst layer 12 will be high, the resistance in the interface will be low, and the characteristic of the power generation of the polymer electrolyte fuel cell will be good. Further, even when the humidification degree changes, since the adhesion of the interface is high, peeling will not take place, and the output voltage of the polymer electrolyte fuel cell will not thereby decrease. Namely, the durability against a humidity change will be excellent.

Polymer Electrolyte Fuel Cells

A polymer electrolyte fuel cell may be obtained by disposing separators having gas channels formed, on both sides of the membrane-electrode assembly obtained by the production process of the present invention.

The separators may, for example, be separators made of various electric conductive materials, such as a metal separator, a carbon separator and a separator made of a material of a mixture of graphite and a resin.

With respect to the polymer electrolyte fuel cell, the power generation is carried out by supplying gas containing oxygen to the cathode, and gas containing hydrogen to the anode. Further, it is possible to apply the membrane-electrode assembly obtained by the production process of the present invention also to a methanol fuel cell wherein the power generation is carried out by supplying methanol to the anode.

Example

Now, the present invention will be described in detail with reference to Examples, but it should be understood that the present invention is by no means restricted to such Examples.

Examples 1, 2 and 3 are examples of the present invention, and Example 4 is a comparative example.

Copolymer H

A copolymer H1 (ion exchange capacity: 1.1 meq/g dry resin) comprising units based on TFE and repeating units of the following formula (1-1) was provided.

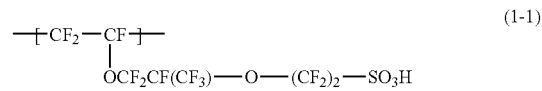
(1-1)

Polymer Electrolyte Membrane

The copolymer H1 was dispersed in a solvent mixture of ethanol and water (ethanol/water=60/40 (mass ratio)) to prepare a coating solution for the electrolyte membrane having a solid concentration of 25 mass %.

The coating solution for the electrolyte membrane was applied on an ETFE film (substrate film) by using a die coater so that a thickness of a dried membrane would be 25 μm, followed by drying in a dryer at 90° C. for 10 minutes, and it was further annealed at 140° C. for 30 minutes. The ETFE film was then removed to obtain a polymer electrolyte membrane (A).

Gas Diffusion Layer

As a gas-diffusing substrate to constitute a gas diffusion layer, a carbon paper (manufactured by NOK Corporation, tradename: H2315T10AC1) (hereinafter referred to as a carbon paper (B)) having its surface treated for water repellency by a dispersion containing carbon black particles and tetrafluoroethylene, was provided.

Coating Solution for Anode Catalyst Layer

The copolymer H1 was dispersed in ethanol to prepare a copolymer dispersion having a solid concentration of 10 mass %.

33 g of a catalyst (manufactured by Tanaka Kikinzoku Kogyo K.K., tradename: TEC61E54, the amount of platinum/ruthenium alloy supported: 53 mass %) having a platinum/ruthenium alloy (platinum/ruthenium=31/22 (mass ratio)) dispersed on a carbon support (specific surface area: 800 m²/g) was added to 227.5 g of distilled water and homogenized by means of an ultrasonic homogenizer. Further, 117.5 g of ethanol was added thereto, followed by thorough stirring to prepare an electrode catalyst dispersion.

To the electrode catalyst dispersion, 122.5 g of the copolymer dispersion was added, followed by thorough stirring to prepare a coating solution (C) for an anode catalyst layer.

Coating Solution for Cathode Catalyst Layer

The copolymer H1 was dispersed in ethanol to prepare a copolymer dispersion having a solid concentration of 10 mass %.

35 g of a catalyst having a platinum/cobalt alloy (platinum/cobalt=36/4 (mass ratio)) dispersed on a carbon support (specific surface area: 250 m$^2$/g) (the amount of platinum/cobalt alloy supported: 40 mass %) was added to 226.5 g of distilled water and homogenized by means of an ultrasonic homogenizer. Further, 37.5 g of ethanol was added thereto, followed by thorough stirring to prepare an electrode catalyst dispersion.

To the electrode catalyst dispersion, 210 g of the copolymer dispersion was added, followed by thorough stirring to prepare a coating solution (D) for a cathode catalyst layer.

Substrate Film Having Release Layer Formed on its Surface

The copolymer H1 was dispersed in a solvent mixture of ethanol and water (ethanol/water=60/40 (mass ratio)) to prepare a coating solution for the release layer having a solid concentration of 6 mass %.

The coating solution for the release layer was applied on an ETFE film by using a die coater, so that the thickness of a dried membrane would be 2 μm, followed by drying in a dryer at 80° C. for 10 minutes to obtain a substrate film having the release layer formed on the surface.

Example 1

Step (a)

The coating solution (C) for an anode catalyst layer was applied on the ETFE film by using a die coater, so that the amount of platinum would be 0.2 mg/cm$^2$, thereby to form a coating solution layer.

Step (b)

Immediately after the coating solution layer was formed, the carbon paper (B) was put on the coating solution layer, followed by drying in a dryer at 80° C. for 15 minutes to form an anode catalyst layer.

Step (c)

The ETFE film was removed from the anode catalyst layer to obtain an anode consisting of the carbon paper (B) and the anode catalyst layer.

Step (d)

The coating solution (D) for a cathode catalyst layer was applied on the ETFE film by using a die coater, so that the amount of platinum would be 0.2 mg/cm$^2$, thereby to form a coating solution layer.

Step (e)

Immediately after the coating solution layer was formed, the carbon paper (B) was put on the coating solution layer, followed by drying in a dryer at 80° C. for 15 minutes to form a cathode catalyst layer.

Step (f)

The ETFE film was removed from the cathode catalyst layer to obtain a cathode consisting of the carbon paper (B) and the cathode catalyst layer.

Step (g)

The polymer electrolyte membrane (A) was disposed between the anode and the cathode, and catalyst layers of the respective electrodes are laminated to be in contact with the polymer electrolyte membrane (A). This laminate was put in a press machine preliminarily heated to 140° C. and hot-pressed for one minute under a pressing pressure of 1.5 MPa to obtain a membrane-electrode assembly having an electrode area of 25 cm$^2$.

Evaluation of Characteristic of Power Generation

The membrane-electrode assembly was assembled into a cell for power generation, and hydrogen (utilization rate: 70%)/air (utilization rate: 50%) was supplied under normal pressure, and the cell voltage at the initial stage of the operation at current density of 0.2 A/cm$^2$ or 1.0 A/cm$^2$ was measured at a cell temperature of 65° C. Here, to the anode side, hydrogen having a dew point of 65° C. was supplied, and to the cathode side, air having a dew point of 65° C. was supplied. The cell voltage is shown in Table 1.

Evaluation of Durability Against Humidity Change

The membrane-electrode assembly was assembled into a cell for power generation, and under normal pressure, nitrogen was supplied to both electrodes with a rate of 1 L/min. Every two minutes, dried air and 150% humidified air were alternatively permitted to flow through the electrodes, and under a condition where a differential pressure of 20 kPa was periodically exerted, the permeant quantity of nitrogen was measured. The permeant quantity of nitrogen after 20,000 times is shown in Table 1. No change was observed as compared with the initial value.

Adhesion Strength of Interface Between Membrane and Electrode

The catalyst layer of the anode and the polymer electrolyte membrane (A) were arranged to be in contact with each other and were put in a press machine preliminarily heated to 140° C. and hot-pressed for one minute under a pressing pressure of 1.5 MPa to prepare a membrane-anode assembly wherein the anode and the polymer electrolyte membrane (A) were bonded. The side of the gas diffusion layer of the assembly was fixed, and the end portion of the polymer electrolyte membrane (A) was clipped with a chuck of a tensile tester. The 90° peel strength was measured under the following conditions. The 90° peel strength is shown in Table 1.

Sample width: 25 mm

Peeling rate: 50 mm/min

Temperature: 25° C.

The catalyst layer of the cathode and the polymer electrolyte membrane (A) were arranged to be in contact with each other and were put in a press machine preliminarily heated to 140° C. and hot-pressed for one minute under a pressing pressure of 1.5 MPa to prepare a membrane-cathode assembly wherein the cathode and the polymer electrolyte membrane (A) were bonded. With respect to the assembly, the 90° peel strength was measured in the same manner. The 90° peel strength is shown in Table 1.

Example 2

Steps (a) to (c)

The anode was obtained in the same manner as in the steps (a) to (c) in Example 1.

Step (d")

The coating solution (D) for the cathode catalyst layer was applied on the carbon paper (B) by a die coater so that the amount of platinum would be 0.2 mg/cm$^2$, thereby to form a coating solution layer.

Step (e")

The coating solution layer was dried in a dryer at 80° C. for 15 minutes to form a cathode catalyst layer, thereby to obtain a cathode consisting of the carbon paper (B) and the cathode catalyst layer.

Step (g)

The membrane-electrode assembly having an electrode area of 25 cm$^2$ was obtained in the same manner as in the step (g) in Example 1.

With respect to the membrane-electrode assembly, the characteristic of the power generation and the durability against a humidity change were evaluated. The results are shown in Table 1. The permeant quantity of nitrogen after 20,000 times had no change as compared with the initial value.

Example 3

Step (a')

The coating solution (C) for the anode catalyst layer was applied on the release layer formed on the substrate film by a die coater so that the amount of platinum would be 0.2 mg/cm$^2$, thereby to form a coating solution layer.

Step (b)

Immediately after the coating solution layer was formed, the carbon paper (B) was put on the coating solution layer, followed by drying in a dryer at 80° C. for 15 minutes to form an anode catalyst layer.

Step (c)

The ETFE film was removed from the release layer to obtain an anode consisting of the carbon paper (B) and the anode catalyst layer.

Step (d')

The coating solution (D) for the cathode catalyst layer was applied on the release layer formed on the substrate film by a die coater so that the amount of platinum would be 0.2 mg/cm$^2$, thereby to form a coating solution layer.

Step (e)

Immediately after the coating solution layer was formed, the carbon paper (B) was put on the coating solution layer, followed by drying in a dryer at 80° C. for 15 minutes to form a cathode catalyst layer.

Step (f)

The ETFE film was removed from the release layer to obtain a cathode consisting of the carbon paper (B) and the cathode catalyst layer.

Step (g)

The membrane-electrode assembly having an electrode area of 25 cm$^2$ was obtained in the same manner as in the step (g) in Example 1.

With respect to the membrane-electrode assembly, the characteristic of the power generation and the durability against a humidity change were evaluated. The results are shown in Table 1. The permeant quantity of nitrogen after 20,000 times had no change as compared with the initial value.

Further, the 90° peel strength was measured in the same manner as in Example 1. The results are shown in Table 1.

Example 4

Step (a")

The coating solution (C) for the anode catalyst layer was applied on the carbon paper (B) by a die coater so that the amount of platinum would be 0.2 mg/cm$^2$, thereby to form a coating solution layer.

Step (b")

The coating solution layer was dried in a dryer at 80° C. for 15 minutes to form an anode catalyst layer, thereby to obtain an anode consisting of the carbon paper (B) and the anode catalyst layer.

Steps (d") and (e")

The cathode was obtained in the same manner as in the steps (d") and (e") in Example 2.

Step (g)

The membrane-electrode assembly having an electrode area of 25 cm$^2$ was obtained in the same manner as in the step (g) in Example 1.

With respect to the membrane-electrode assembly, the characteristic of the power generation and the durability against a humidity change were evaluated. The results are shown in Table 1. The permeant quantity of nitrogen after 20,000 times remarkably increased as compared with the initial value.

Further, the 90° peel strength was measured in the same manner as in Example 1. The results are shown in Table 1.

TABLE 1

| | Characteristic of power generation | | Durability against humidity change Permeant quantity of nitrogen | 90° peel strength | |
|---|---|---|---|---|---|
| | Cell voltage (V) | | | Membrane/ | Membrane/ |
| | 0.2 A/cm$^2$ | 1.0 A/cm$^2$ | after 20,000 times (cm$^3$/min) | Anode (N/cm) | cathode (N/cm) |
| Ex. 1 | 0.764 | 0.565 | 0.1 | 0.11 | 0.13 |
| Ex. 2 | 0.767 | 0.560 | 0.1 | — | — |
| Ex. 3 | 0.766 | 0.572 | 0.1 | 0.13 | 0.12 |
| Ex. 4 | 0.753 | 0.508 | 12 | 0.04 | 0.05 |

The membrane-electrode assembly of the present invention has a high output voltage in a wide range of current densities and thus is very useful for polymer electrolyte fuel cells to be used for power sources for mobiles such as automobiles, distributed power generation systems, household cogeneration systems, etc.

The entire disclosure of Japanese Patent Application No. 2007-202934 filed on Aug. 3, 2007 including specification, claims, drawings and summary is incorporated herein by reference in its entirety.

What is claimed is:

1. A process for producing a membrane-electrode assembly for polymer electrolyte fuel cells, which comprises a first electrode comprising a catalyst layer and a gas diffusion layer, a second electrode comprising a catalyst layer and a gas diffusion layer, and a polymer electrolyte membrane disposed between the catalyst layer of the first electrode and the catalyst layer of the second electrode, said process comprising the following steps (a) to (c) and (g):
   (a) a step of applying a coating solution containing an electrode catalyst and an ion exchange resin on a substrate film to form a coating solution layer,
   (b) a step of putting a gas diffusion layer on the coating solution layer formed in the step (a), followed by drying the coating solution layer to form a catalyst layer,
   (c) a step of removing the substrate film from the catalyst layer formed in the step (b) to obtain the first electrode, and
   (g) a step of heat-bonding the first electrode, the second electrode and the polymer electrolyte membrane, to have the catalyst layer and the polymer electrolyte membrane contacted to each other.

2. The process for producing a membrane-electrode assembly for polymer electrolyte fuel cells according to claim 1, which further contains the following steps (d) to (f):
   (d) a step of applying a coating solution containing an electrode catalyst and an ion exchange resin on a substrate film to form a coating solution layer,
   (e) a step of putting a gas diffusion layer on the coating solution layer formed in the step (d), followed by drying the coating solution layer to form a catalyst layer, and
   (f) a step of removing the substrate film from the catalyst layer formed in the step (e) to obtain the second electrode.

3. The process for producing a membrane-electrode assembly for polymer electrolyte fuel cells according to claim 1, wherein the electrode catalyst contains a noble metal, and the amount of the noble metal per unit area of the catalyst layer is from 0.01 to 0.5 mg/cm$^2$.

4. The process for producing a membrane-electrode assembly for polymer electrolyte fuel cells according to claim 2, wherein the electrode catalyst contains a noble metal, and the amount of the noble metal per unit area of the catalyst layer is from 0.01 to 0.5 mg/cm$^2$.

5. A process for producing a membrane-electrode assembly for polymer electrolyte fuel cells, which comprises a first electrode comprising a release layer, a catalyst layer and a gas diffusion layer in this order, a second electrode comprising a catalyst layer and a gas diffusion layer, and a polymer electrolyte membrane disposed between the release layer of the first electrode and the catalyst layer of the second electrode, the process comprising the following steps (a'), (b), (c) and (g):
   (a') a step of applying a coating solution containing an electrode catalyst and an ion exchange resin on a release layer formed on the surface of a substrate film, to form a coating solution layer,
   (b) a step of putting a gas diffusion layer on the coating solution layer formed in the step (a'), followed by drying the coating solution layer to form a catalyst layer,
   (c) a step of removing the substrate film from the release layer after the step (b), to obtain the first electrode, and
   (g) a step of heat-bonding the first electrode, the second electrode and the polymer electrolyte membrane, to have the release layer of the first electrode and the polymer electrolyte membrane contacted to each other and to have the catalyst layer of the second electrode and the polymer electrolyte membrane contacted to each other.

6. The process for producing a membrane-electrode assembly for polymer electrolyte fuel cells according to claim 5, wherein the release layer contains an ion exchange resin, and the thickness of the release layer is from 0.1 to 5 μm.

7. The process for producing a membrane-electrode assembly for polymer electrolyte fuel cells according to claim 5, wherein the electrode catalyst contains a noble metal, and the amount of the noble metal per unit area of the catalyst layer is from 0.01 to 0.5 mg/cm$^2$.

8. The process for producing a membrane-electrode assembly for polymer electrolyte fuel cells according to claim 6, wherein the electrode catalyst contains a noble metal, and the amount of the noble metal per unit area of the catalyst layer is from 0.01 to 0.5 mg/cm$^2$.

9. A process for producing a membrane-electrode assembly for polymer electrolyte fuel cells, which comprises a first electrode comprising a release layer, a catalyst layer and a gas diffusion layer in this order, a second electrode comprising a release layer, a catalyst layer and a gas diffusion layer in this order, and a polymer electrolyte membrane disposed between the release layer of the first electrode and the release layer of the second electrode, the process comprising the following steps (a'), (b), (c), (d'), (e), (f) and (g):
   (a') a step of applying a coating solution containing an electrode catalyst and an ion exchange resin on a release layer formed on the surface of a substrate film, to form a coating solution layer,
   (b) a step of putting a gas diffusion layer on the coating solution layer formed in the step (a'), followed by drying the coating solution layer to form a catalyst layer,
   (c) a step of removing the substrate film from the release layer after the step (b), to obtain the first electrode, (d') a step of applying a coating solution containing an electrode catalyst and an ion exchange resin on a release layer formed on the surface of a substrate film, to form a coating solution layer, (e) a step of putting a gas diffusion layer on the coating solution layer formed in the step (d'), followed by drying the coating solution layer to form a catalyst layer, (f) a step of removing the substrate film from the release layer after the step (e), to obtain the second electrode, and (g) a step of heat-bonding the first electrode, the second electrode and the polymer electrolyte membrane, to have the catalyst layer and the polymer electrolyte membrane contacted to each other.

10. The process for producing a membrane-electrode assembly for polymer electrolyte fuel cells according to claim 9, wherein the release layer contains an ion exchange resin, and the thickness of the release layer is from 0.1 to 5 μm.

11. The process for producing a membrane-electrode assembly for polymer electrolyte fuel cells according to claim 9, wherein the electrode catalyst contains a noble metal, and the amount of the noble metal per unit area of the catalyst layer is from 0.01 to 0.5 mg/cm$^2$.

12. The process for producing a membrane-electrode assembly for polymer electrolyte fuel cells according to claim 10, wherein the electrode catalyst contains a noble metal, and the amount of the noble metal per unit area of the above catalyst layer is from 0.01 to 0.5 mg/cm$^2$.

13. The process for producing a membrane-electrode assembly for polymer electrolyte fuel cells according to claim 3, wherein the noble metal is platinum.

14. The process for producing a membrane-electrode assembly for polymer electrolyte fuel cells according to claim 4, wherein the noble metal is platinum.

15. The process for producing a membrane-electrode assembly for polymer electrolyte fuel cells according to claim 7, wherein the noble metal is platinum.

16. The process for producing a membrane-electrode assembly for polymer electrolyte fuel cells according to claim 8, wherein the noble metal is platinum.

17. The process for producing a membrane-electrode assembly for polymer electrolyte fuel cells according to claim 11, wherein the noble metal is platinum.

18. The process for producing a membrane-electrode assembly for polymer electrolyte fuel cells according to claim 12, wherein the noble metal is platinum.

19. The process for producing a membrane-electrode assembly for polymer electrolyte fuel cells according to claim 6, wherein the ion exchange resin of the release layer comprises a fluorinated ion exchange resin.

20. The process for producing a membrane-electrode assembly for polymer electrolyte fuel cells according to claim 10, wherein the ion exchange resin of the release layer comprises a fluorinated ion exchange resin.

* * * * *